Patented Aug. 14, 1934

1,970,535

UNITED STATES PATENT OFFICE 1,970,535

METHOD OF SEPARATING OR EXTRACTING BODIES FROM PARTIAL OXIDATION PRODUCTS

Joseph Hidy James, Pittsburgh, Pa., assignor to Clarence P. Byrnes, Sewickley, Pa., trustee No Drawing. Application March 12, 1930, Serial No. 435,375

7 Claims. (Cl. 260—116)

In the synthetic manufacture of oxygen-containing aliphatic hydrocarbons, a liquid mixture of several different classes of bodies in the range from alcohols to oxygenated organic acids is obtained, each class being present in a range of different molecular weights. Hence, this liquid mixture is of unusual complexity and it has been a matter of great difficulty to extract or separate a class or classes of bodies therefrom in obtaining industrial products. For example, in my vapor or gaseous phase partial oxidation process, wherein hydrocarbon is mixed with an oxygen containing gas and passed through a hot reaction zone, preferably in contact with a catalyst, at a temperature below that of continuous self-sustained complete combustion, both the products condensed and collected in the scrubbers are of great complexity including more highly oxidized and less highly oxidized bodies each of different molecular weights.

The present invention relates to the extraction from such mixtures of different bodies or classes of bodies or the separation of the mixture into different classes of bodies. I have found that such extraction can be effected by the use of liquid sulphur dioxide at relatively low temperatures. I am aware of the Edeleanu process of refining petroleum oils, in which instead of employing sulphuric acid in such refining, liquid $SO_2$ is used to remove aromatic unsaturated and other industrial hydrocarbons.

My process does not relate to the treatment of hydrocarbons, but to the treatment of liquid mixtures containing material proportions of oxygen-containing hydrocarbons and to the separation of certain bodies therefrom at relatively low temperatures. The main object of my invention lies in the extraction of the more highly oxidized bodies from the less highly oxidized bodies in the liquid mixture by careful control of treatment with $SO_2$ at temperatures below those allowing hydrocarbon solubility; but it is also possible by regulating and controlling the temperature to extract the oxidized bodies with the contained olefins and aromatics in one operation. Solubility of such hydrocarbons and their oxidized derivatives increases with temperature, and hence a means is afforded of effecting fractional extraction by careful regulation or control of temperature. Liquid sulphur dioxide boils under atmospheric pressure at about —8° C., and hence, if the extraction is at atmospheric pressure, it should be carried on below that temperature.

In the following examples, the pressure was atmospheric and the temperature was held at —18° to —20° by suitable freezing mixtures.

Example I

A partially oxidized gasoline subsequently thermolized or decomposed at about 450° C. over alumina was taken as the mixture to treat. This was cooled to —18° C. and one and one-half volumes of liquid sulphur dioxide for each volume of oxidation mixture added. Layers were formed and the lower layer containing liquid $SO_2$ drawn off and the $SO_2$ allowed to evaporate by a rise in temperature. This gave an extract of the more highly oxidized bodies to an amount of 68%, leaving a difference of 32% by volume of the paraffin series and naphthene bodies. A careful chemical analysis of the original product treated showed 46.6% by volume of oxidized bodies, olefins and terpenes; 19.8% by volume of aromatics and 33.6% by volume of substantially unchanged hydrocarbons of the paraffin and naphthene series.

Hence, it is apparent that the above extraction gave a nearly complete separation from the paraffin and naphthene bodies of the other bodies present.

Example II

A partially oxidized gasoline which had been treated by my vapor phase oxidation process was taken, its analysis showing 39% by volume of oxidized bodies and olefins; 6.6% by volume of aromatics, and 54.4% by volume of members of the paraffin and naphthene series.

A liquid sulphur dioxide extraction carried out at low temperature substantially similar to that of Example I showed from the lower layer, after evaporation of the sulphur dioxide, 44% of oxidized bodies, olefins and aromatics leaving 56% for the members of the paraffin and naphthene series; this again being substantially in accord with the results of analysis of the material thus extracted.

From the separated mixture containing oxidized bodies, olefins and aromatics, the oxidized bodies may be separated by regulated treatment with diluted ethyl alcohol or isopropyl alcohol, as set forth for example in my United States Patents Nos. 1,782,963 and 1,782,964, granted November 25, 1930. As therein set forth, alcohol diluted to different degrees of strength acts to separate more highly oxidized from less highly oxidized bodies in the product. The degree of dilution affects the degree of solubility.

In the present liquid SO₂ process, the order of extraction will be, first the acids; next the aldehydes and next the alcohols. In other words, from the more highly oxidized to the less highly oxidized compounds. Hence to extract the more highly oxidized bodies and to remove the oxidized bodies only, the treatment must be carried out at temperatures below which two or three active hydrocarbon groups, such as olefins, aromatics and terpenes, dissolve in the liquid sulphur dioxide.

Therefore, by careful regulation and control of the temperature these bodies may be separated from each other in the extraction, and several different classes of bodies obtained under different temperatures all below the boiling point of the liquid sulphur dioxide. Of course, in each case the sulphur dioxide is distilled off and recovered in a closed system, the same as in the Edeleanu process.

In order to make these separations of the different classes of bodies, the temperatures must be carried down to —45° C. and lower, and we must also regulate carefully the addition of the liquid sulphur dioxide in order to accomplish the gradation desired in the products removed.

It will be understood that the Edeleanu system or plant apparatus may be employed with the heat recovered, SO₂ recovered, etc., as now well known in that process.

Many changes may be made in the form of apparatus employed, in the temperatures used and other parts of the process without departing from my invention.

I claim:

1. In the process of separating the more highly oxidized bodies from the less highly oxidized bodies of a liquid mixture containing oxygen derivatives of hydrocarbons in the range from alcohols to oxygenated organic acids, the steps consisting of treating the same with liquid sulphur dioxide at a temperature below the boiling point, allowing the temperature to rise to effect fractional extraction, and recovering sulphur dioxide.

2. In the process of separating the more highly oxidized bodies from the less highly oxidized bodies of a liquid mixture containing oxygen derivatives of hydrocarbons in the range from alcohols to oxygenated organic acids, the steps consisting of treating the same with liquid sulphur dioxide at a temperature below its boiling point, varying the temperature during the extraction to obtain fractional extraction, and recovering sulphur dioxide.

3. In the process of separating the more highly oxidized bodies from the less highly oxidized bodies of a liquid mixture containing oxygen derivatives of hydrocarbons in the range from alcohols to oxygenated organic acids, the steps consisting of treating the same with liquid sulphur dioxide at a temperature below its boiling point, and then treating an extracted portion containing oxygen derivatives with a selective solvent other than water to further separate bodies of different degrees of oxidation therein.

4. In the process of separating the more highly oxidized bodies from the less highly oxidized bodies of a liquid mixture containing oxygen derivatives of hydrocarbons in the range from alcohols to oxygenated organic acids, the steps consisting of treating the same with liquid sulphur dioxide at a temperature below its boiling point, and then treating an extracted portion containing oxygen derivatives with dilute alcohol to further separate bodies of different degrees of oxidation therein.

5. As a new composition of matter, Edeleanu extract of a partially oxidized petroleum fraction, said extract containing the more highly oxidized bodies and a reduced and relatively small proportion of less highly oxidized bodies.

6. In the process of separating the more highly oxidized bodies from the less highly oxidized bodies of a liquid mixture containing oxygen derivatives of hydrocarbons in the range from alcohols to oxygenated organic acids, the step consisting in treating the same with liquid sulphur dioxide at a temperature below its boiling point and to an amount sufficient to dissolve the more highly oxidized compounds but insufficient to dissolve all of the oxidized compounds.

7. In the process of separating the more highly oxidized bodies from the less highly oxidized bodies of a liquid mixture containing oxygen derivatives of hydrocarbons in the range from alcohols to oxygenated organic acids, the steps consisting of treating the same with liquid sulphur dioxide at a temperature below its boiling point, and separating and removing the more highly oxidized compounds from the less highly oxidized compounds.

JOSEPH HIDY JAMES.